US007949479B2

(12) United States Patent
Brown et al.

(10) Patent No.: US 7,949,479 B2
(45) Date of Patent: May 24, 2011

(54) IN ON OR RELATING TO ROTATING MACHINES

(75) Inventors: James Brown, Lincoln (GB); Francis Heyes, Lincoln (GB); Ulf Nilsson, Whetstone (GB); Stephen Wilson, Lincoln (GB)

(73) Assignee: Napier Turbochargers Limited, Lincoln, Lincolnshire (GB)

( * ) Notice: Subject to any disclaimer, the term of this patent is extended or adjusted under 35 U.S.C. 154(b) by 465 days.

(21) Appl. No.: 11/989,588

(22) PCT Filed: Jul. 13, 2006

(86) PCT No.: PCT/EP2006/064171
§ 371 (c)(1), (2), (4) Date: Jan. 28, 2008

(87) PCT Pub. No.: WO2007/014830
PCT Pub. Date: Feb. 8, 2007

(65) Prior Publication Data

US 2009/0287448 A1 Nov. 19, 2009

(30) Foreign Application Priority Data

Jul. 30, 2005 (GB) .................................. 0515773.0

(51) Int. Cl.
*G01B 3/44* (2006.01)
*G01K 1/02* (2006.01)

(52) U.S. Cl. ...................................... 702/34; 346/33 TP

(58) Field of Classification Search .................... 702/34, 702/33, 41–44, 56, 84, 127, 130–132, 145–148, 702/176, 182–185, 35–36, 80–81, 136, 141–142, 702/188–189; 324/160, 162, 207.23, 207.25, 324/209, 500, 512, 513; 415/30, 47, 107; 73/1.08, 1.09, 1.14, 1.37, 1.79, 1.84, 488, 73/494, 760, 763, 799, 781, 783, 787, 843; 374/100–104, 137; 701/29, 33, 135; 346/3, 33 F, 33 R, 33 TP
See application file for complete search history.

(56) References Cited

U.S. PATENT DOCUMENTS 5,033,010 A * 7/1991 Lawrence et al. ............... 701/35
(Continued)

FOREIGN PATENT DOCUMENTS

DE 44 27 880 A1 2/1996
(Continued)

OTHER PUBLICATIONS

Chin, H., Turbine Engine Hot Section Prognostics, Mar. 28, 2005, Proceedings of the 59th Mechanical Failures Prevention Technology Meeting, Virginia Beach, VA, pp. 1-9.*

(Continued)

*Primary Examiner* — Michael P Nghiem
*Assistant Examiner* — Toan M Le
(74) *Attorney, Agent, or Firm* — Egbert Law Offices PLLC

(57) ABSTRACT

A rotating machine, has a rotary component, which includes a memory device for storing data relating to the past use of the component. The data are associated with rotational speed and ambient temperature, which are detected by detectors either on or off the rotary component. The stored data may be the raw temperature and speed data as sampled over time, which are then used to derive values of low-cycle fatigue and creep damage. These fatigue and creep values are, in turn, correlated with the load profiles of the component to arrive at a value of elapsed lifespan for the component. Alternatively, the stored data may be the fatigue and creep values and/or, preferably, values of elapsed and remaining lifespan of the component. In a second embodiment the detectors are located on the machine casing along with an evaluation unit.

20 Claims, 5 Drawing Sheets

U.S. PATENT DOCUMENTS

| | | | | |
|---|---|---|---|---|
| 5,210,704 | A * | 5/1993 | Husseiny | 702/34 |
| 6,209,390 | B1 | 4/2001 | LaRue et al. | |
| 6,297,742 | B1 | 10/2001 | Canada et al. | |
| 6,449,565 | B1 | 9/2002 | Budrow et al. | |
| 2005/0096873 | A1 | 5/2005 | Klein | |

FOREIGN PATENT DOCUMENTS

| | | | |
|---|---|---|---|
| GB | 2225125 | | 5/1990 |
| JP | 64021226 | U | 2/1989 |
| JP | 4224203 | A | 8/1992 |
| JP | 6194275 | A | 7/1994 |
| JP | 2005024441 | A | 1/2005 |
| SU | 773657 | | 10/1980 |

OTHER PUBLICATIONS

Ashby et al., Intelligent Maintenance Advisor for Turbine Engines, 2000 IEEE, pp. 211-219.*

Applied Concept Research, Inc., Publications, Technical Papers, 2002-2005, pp. 1-3.*

DeAnna, R., Wireless Telemetry for Gas-Turbine Applications, Mar. 2000, NASA/TM-2000-209815, 20 pp.*

* cited by examiner

FIG 5

Table of hours of data for creep calculation

| speed, rpm between | and | tempC from / to | 0 / 5 | 5 / 10 | 10 / 15 | 15 / 20 | 20 / 25 | 25 / 30 | 30 / 35 | 35 / 40 | 40 / 45 |
|---|---|---|---|---|---|---|---|---|---|---|---|
| 10000 | 10999 | | 0.5 | 1 | 3 | 5 | 8 | 5 | 5 | 7 | 8 |
| 11000 | 11999 | | 1 | 3 | 5 | 6 | 7 | 8 | 9 | 12 | 14 |
| 12000 | 12999 | . | | | | | | | | | |
| 13000 | 13999 | . | | 6 | <- ie it's run for 6 hours between 13000 and 13999 rpm at 5 to 10 deg C inlet temp | | | | | | |
| 14000 | 14999 | . | | | | | | | | | |
| 15000 | 15999 | . | | | | | | | | | |
| 16000 | 16999 | . | | | | | | | | | |
| 17000 | 17999 | . | | | . | | | | | | |
| 18000 | 18999 | | | | . | | . | | | | |
| 19000 | 19999 | | | | . | | . | | | | |
| 20000 | 20999 | | | | | | . | | | | |
| 21000 | 21999 | | | | | | | | | | |
| 22000 | 22999 | | | | | | | | | | |

FIG 6

Table of number of accelerations and deccelerations for fatigue calculation

| speed TO, rpm between | and | speed FROM, rpm between 0 and | 10001 10500 | 10501 11000 | 11001 11500 | 11501 12000 | 12001 12500 | 12501 13000 | 10001 13500 | 13501 14000 | 14001 14500 |
|---|---|---|---|---|---|---|---|---|---|---|---|
| | 0 | x | 1 | | | | | | | | |
| 10000 | 10499 | | x | | | | | | | | |
| 10500 | 10999 | | | x | 6 | 4 | | | | | |
| 11000 | 11499 | | | | x | | | | | | |
| 11500 | 11999 | | | | | x | | | | | |
| 12000 | 12499 | | | | | | x | | | | |
| 12500 | 12999 | | | | 12 | | | x | 56 | | |
| 13000 | 13499 | | | | | | | | x | 89 | |
| 13500 | 13999 | | 4 | | | 3 | | | | x | |
| 14000 | 14499 | | | | | | | 56 | | | x |
| 14500 | 14999 | | | | | | | | | | |
| 15000 | 15499 | | | | | | | | | | |

numbers above the row of x's are deccelerations

<- ie it's decelerated from the speed (11501 to 12000) rpm to (10500 to 10999)rpm numbers below the row of x's are acceleration

IN ON OR RELATING TO ROTATING MACHINES

CROSS REFERENCE TO RELATED APPLICATIONS

This application is the US National Stage of International Application No. PCT/EP2006/064171, filed Jul. 13, 2006 and claims the benefit thereof. The International Application claims the benefits of British application No. 0515773.0 filed Jul. 30, 2005, both of the applications are incorporated by reference herein in their entirety.

FIELD OF INVENTION

The invention relates to a rotating machine including a rotary component, and to a rotating machine which is a turbomachine in which the rotary component is an impeller. The invention also relates to the rotary component itself.

BACKGROUND OF THE INVENTION

Turbomachines are in common use in a Diesel-engine environment. Diesel engines are found to require ever increasing turbocharger pressure ratios. Indeed, it has been estimated that every 10 years or so an increase of 0.75 bar is called for, largely as a result of increasingly stringent emissions regulations. As pressure ratio requirements increase, so stresses and temperatures on the impellers of turbochargers increase, which can affect the maximum operational lifespan of the impeller. Consequently there is a need to try to avoid keeping an impeller so long in service that it fails.

To achieve this, one approach has been to replace an impeller after a length of time which is assumed to represent the normal lifespan of the impeller, typically 50,000 hours. However, this can result in possible impeller failure if the impeller's life falls short of this figure. An alternative approach is to change the impeller components at regular conservative intervals. This, however, usually ignores the fact that, for part of their life within the turbocharger, these components are not in operation or are operating below their nominal duty profile (i.e. nominal number of hours at specific loads, numbers of cycles, etc.). Hence an additional cost is imposed on the turbocharger owner and manufacturer. Similarly, a manufacturer of a refurbished turbocharger will very often decide to install a new impeller in order to safely meet a minimum life requirement. This also will have a cost penalty where the impeller, which has been removed, is not yet at the end of its useful life.

A further measure sometimes taken to avoid failure of an impeller is to move away from the aluminium-based materials which are currently standard, to titanium-based materials offering improved mechanical strength. However, while this can provide a substantial margin of operational safety, it typically increases the cost of a turbocharger by 30%, which is clearly undesirable.

In some situations the problem of limited impeller life is simply ignored altogether, so that impellers are often run very close to their operational limit. This can run the risk of endangering life and property if the impeller fails, with the manufacturer's reputation suffering as a result.

A different approach, which avoids the drawbacks of the approaches already outlined, is to attempt to determine to as high a degree of accuracy as possible what fraction of the maximum lifespan of an impeller has expired at any particular point in time, so that an estimate can be made of the remaining lifespan. This knowledge enables as much of the impeller's total life as possible to be exploited.

The maximum lifespan of an impeller depends primarily on two limiting factors: creep and low-cycle fatigue. Creep is strongly influenced by the time spent at particular stresses and temperatures of the impeller, while low-cycle fatigue is influenced by the peak stresses and the cyclic duty of the impeller. The sites for creep and low-cycle fatigue do not normally coincide, though it is possible for creep to induce fatigue cracks. The stresses are primarily a function of the rotational speed of the impeller. However, the temperature distribution in the impeller can also produce stresses, which will add to the overall stress level. This is particularly exacerbated when the impeller operates in transient conditions, such as cold start and sudden load changes before the temperature distribution has reached steady state. Impeller temperature is a function of ambient temperature and impeller speed, while the cyclic duty of the impeller is a function of the number and nature of the variations in turbocharger speed. The damage which will be suffered by an impeller can be calculated from a knowledge of its duty cycle. This calculation is routinely carried out in the design of impellers, based on an estimated and perhaps an extreme duty, and a component life is then quoted. Typically this will be 50,000 hours, as mentioned earlier. In a similar manner, an estimate can be made of the amount of damage accumulated in a used impeller over a given period of time and a figure for elapsed lifespan derived. The remaining lifespan of the impeller can then be estimated on this basis.

An example of a safety design concept for the safe running of turbocharger impellers is the so-called "SIKO" program developed by ABB. This program, which is outlined in the publication "Turbocharger Maintenance: Optimizing Preventive Maintenance", published in 2003 by ABB, is divided into a number of modules, namely:

determination of load profiles (turbocharger operating conditions);

determination of impeller material properties;

determination of stress and temperature distributions using 2D or 3D finite element analysis;

determination of cumulative damage using the linear Palmgren-Miner Rule; and calculation of expired impeller lifespan from the cumulative damage.

Thus, on the basis of data regarding the impeller material properties, the stress calculations and the temperature distributions in the material, an impeller lifespan calculation can be carried out for a given load profile. The calculations are performed for each critical position of the compressor and turbine.

The use of sampled values of operational speed and temperature of a turbojet, or other type of engine, in order to derive the lifespan of a rotary component is also known from Russian patent SU 773657-B, published on 25 Oct. 1980.

The duty cycle of an impeller can be interpreted from the engine operating records, if any are kept. These records might include the speed of the turbocharger and the intake temperature and are kept within the engine management system and are therefore linked to the engine. Typically, records are kept for one operating point per day. In practice, turbochargers are routinely changed on an engine, either at regular intervals for maintenance purposes (e.g. every 15,000 hours) or as a result of an operational incident. The turbocharger which has been removed, and may still contain the same impeller, can then be used on a different engine, and possibly even on a different application (e.g. a power station, a marine engine, a locomotive, etc.), which may involve a different duty cycle.

Because of the high probability that an impeller or an entire turbocharger may be used on a number of different engines over its lifetime, it has proved very difficult to monitor its duty with any reliability over that period in order to make an accurate assessment of its remaining lifespan.

There is therefore a need to provide a way of assessing with greater reliability the elapsed lifespan of an impeller. In addition, it is desirable to be able to more accurately define the running conditions and cycles experienced by the turbocharger. These cycles can typically vary over a period of seconds rather than once per day, as mentioned earlier.

SUMMARY OF INVENTION

Accordingly, and in accordance with a first aspect of the invention, there is provided a rotary component comprising a first memory device that stores data relating to past use of the component.

The data may include values of a rotational speed of the component and values of a temperature of one or more parts of the component or values of an ambient temperature of the component.

The data may include values of damage sustained by the component and the damage may be fatigue damage and creep damage sustained by the component. The fatigue may be low-cycle fatigue and/or high-cycle fatigue. Preferably the damage is cumulative damage sustained by the component.

The data may include an expired operational lifetime of the component and/or a remaining operational lifetime of the component.

The data may include data relating to changes in the material properties of the component due to ageing of the component.

The data may include one or more of the following: an identity number of the first memory device, the total number of hours during which the rotary component has been operating and the total number of starts undergone by the rotary component.

The rotary component may further include a speed detector for detecting the rotational speed, a temperature detector for detecting the temperature, and a processing means for sampling the speed and temperature values, deriving the data from the speed and temperature values and writing the data into the first memory device. The temperature detector may be a thermocouple or a thermistor and the speed detector may be one of the following: a sensing coil; a Hall-effect device; an accelerometer for measuring vibrations of the rotary component; and a strain gauge mounted on a flexible component in or on the rotary component, said flexible component being distortable under loading of the rotary component.

The rotary component may further comprise a clock source for providing a time reference for the processing means.

The component may be a rotor of, for example, a rotating electrical machine, an impeller of a turbomachine, or a wheel.

At least the first memory device may advantageously be disposed at or near an end-face of the rotor and preferably on or near a longitudinal axis of the rotor. At or near the end-face may be disposed a means for reading out the data stored in the first memory device.

It is advantageous if at least the first memory device is part of a transponder, which is preferably an RF transponder.

In a second aspect of the invention there is provided a rotating machine comprising a rotary component as described above.

The invention further provides, in a third aspect thereof, a rotating machine comprising: a rotary component as described and which further comprises a reception means, and, disposed in or on a part of the rotating machine other than the rotary component, a speed detector, a temperature detector and an evaluation means, the evaluation means including a second memory device and a transmission means, the evaluation means being connected to the speed detector and the temperature detector and arranged to: sample the speed and temperature, derive from the sampled values of the speed and temperature the data relating to past use of the rotary component; store the data in the second memory device and transmit, at predetermined points in time by way of the transmission means, some or all of the data stored in the second memory device to the rotary component; the rotary component being arranged to receive, by way of the reception means, said some or all of said data and to store it in the first memory device.

Under a fourth aspect a rotating machine comprises: a rotary component as described and which further comprises a reception means, and, disposed in or on a part of said rotating machine other than said rotary component, a speed detector, a temperature detector and an evaluation means, the evaluation means including a second memory device and a transmission means, the evaluation means being connected to the speed detector and the temperature detector, and arranged to: sample the speed and temperature, derive from the sampled values of the speed and temperature an amount of cumulative fatigue and creep damage suffered by the rotary component and store this amount in the second memory device; derive from the cumulative fatigue and creep damage amount a value of an expired operation life of the rotary component and store this value in the second memory device; derive from the value of an expired operational life and an estimated maximum life, a value of a remaining operational life of the rotary component and store this value in the second memory device, and transmit, at predetermined points in time by way of the transmission means, some or all of the data stored in the second memory device to the rotary component; the rotary component being arranged to receive, by way of the reception means, said some or all of said data and to store it in the first memory device.

Preferably the first memory device is part of a transponder, and the first memory device stores an identity signature of the transponder.

The evaluation means may be arranged to further store in the second memory device the identity signature and one or both of the following further information: the total number of hours during which the rotary component has been operating and the total number of starts undergone by the rotary component.

Prior to updating the first memory device with new values of the further information and of the remaining operational life, the evaluation means may be arranged to compare the identity signature and existing values of the further information held in the second memory device with the corresponding values held in the first memory device and, if the values are the same, to subsequently store the new values in the first memory device.

The evaluation unit may be arranged to make the comparison and transmit the new values at periodic intervals and/or when the rotary component has stopped rotating and/or when the rotary component is to be removed.

The evaluation means may be arranged such that, when a different rotary component is fitted to the machine, the values of remaining operational lifetime, identification signature and further information stored in the first memory of the different rotary component are read and stored in the second memory.

The rotating machine may be arranged such that, when the different rotary component is an unused component, the values of remaining operational lifetime and of the further information are maximum and zero, respectively.

The rotating machine may be arranged such that, following the fitting of a different rotary component to the machine, the values that are stored in the second memory device are modified versions of the values stored in the first memory device.

Preferably the machine is arranged such that, when it is determined that the transponder is not the correct transponder or that the transponder is not working, an alarm is activated for maintenance purposes.

The transmission means may be an RF transmission means; likewise the transponder may be an RF transponder, and may also be an active transponder.

The rotating machine may be a turbomachine and the rotary component an impeller of the turbomachine.

The evaluation means may be arranged to read data stored in the first memory device and to display the data on a display which is separate from the rotary component.

BRIEF DESCRIPTION OF THE DRAWINGS

Embodiments of the invention will now be described, purely by way of example, with the aid of the appended drawings, of which:

FIGS. 5 and 6 are tables showing exemplary measured temperature and speed characteristics for the calculation of creep and fatigue in a realization of the invention involving a data-binning technique.

DETAILED DESCRIPTION OF INVENTION

Figure 1:
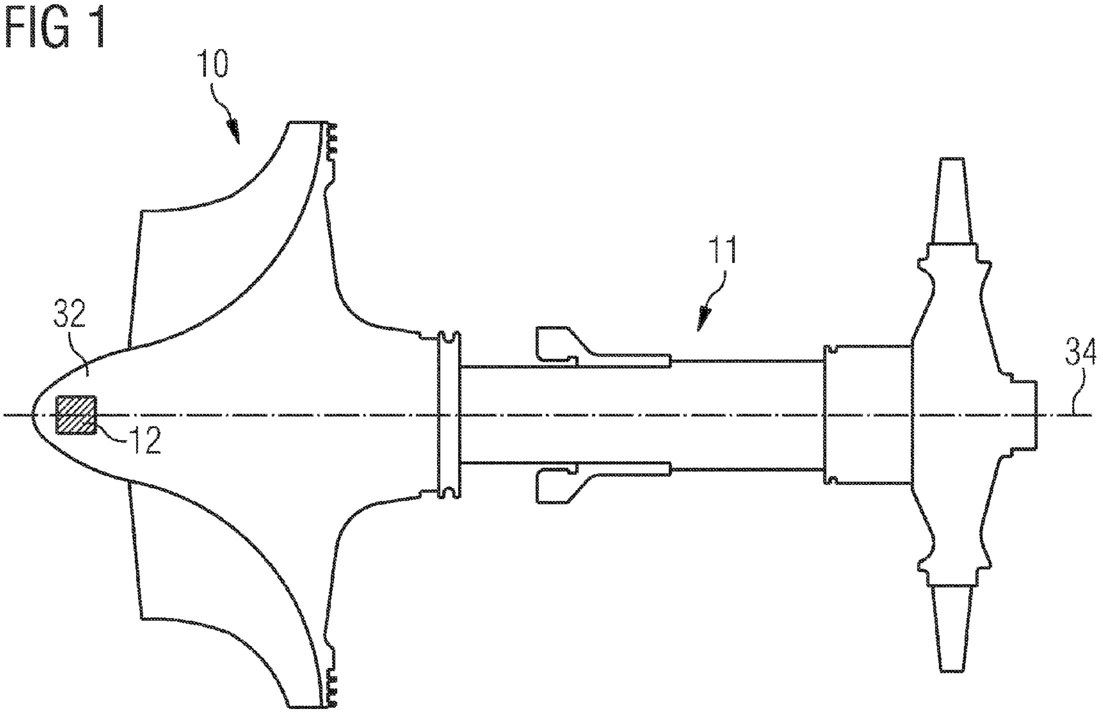
FIG. 1 is a side elevation of a rotor or rotary component including an impeller, in accordance with a first embodiment of the invention.
Figure 2:
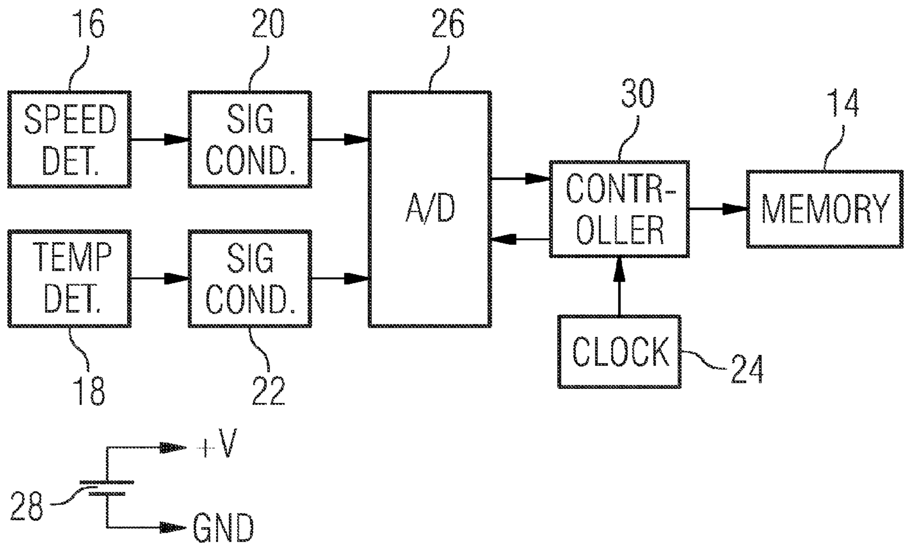
FIG. 2 is a block diagram of a datalogging device employed in the impeller of FIG. 1.

A first embodiment of an impeller in accordance with the invention is illustrated in FIGS. 1 and 2. The impeller 10, which is part of a rotor 11, contains a datalogging device 12, which comprises a memory 14 for storing data relating to the rotational speed and data relating to either the ambient temperature of the air incident on the impeller or the local temperature of the impeller itself. Along with the memory 14 there is included a detector 16 for detecting the rotational speed, a detector 18 for detecting the temperature of the impeller (or ambient temperature), signal conditioning stages 20, 22 for squaring up the waveforms output by the detectors, a source 24 of clock signals, an analogue-to-digital converter 26, a controller 30 for co-ordinating the various operations of the device, and a battery 28 with sufficient capacity to power the various components between services (typically every 2 years). In use, the A/D converter 26 samples the outputs of the speed and temperature detectors sequentially and passes these values on to the memory 14 as data via the controller 30. The clock source 24 provides clocking signals of a suitable frequency or frequencies to trigger the aforementioned sampling operations. In a preferred embodiment, as shown, the memory, detectors, controller and other components are contained in the nose-portion 32 of the impeller along a longitudinal axis 34 thereof. If the positioning on the axis 34 is accurate there will be little or no unbalancing of the rotor, which can help save on setting-up costs.

The temperature detector may be a thermocouple or a thermistor, while the speed detector may take the form of a strain gauge mounted on a flexible component on the impeller, so that the signal from the detector can be related to the distortion of the flexible component when it is centrifugally loaded during rotation of the impeller. Such distortion will be proportional to the speed of the impeller. Alternatively an accelerometer may be used, which monitors the vibrations of the impeller. Since the frequencies of these vibrations will be dominated by the rotational speed of the impeller, the accelerometer will output a signal, after conditioning, which is proportional to rotational speed. Alternatively, the accelerometer may be used to detect speed while being subjected to a centrifugal force from the rotation of the impeller. This solution is less demanding on processing power and battery capacity than the vibration-based approach.

Figure 3:
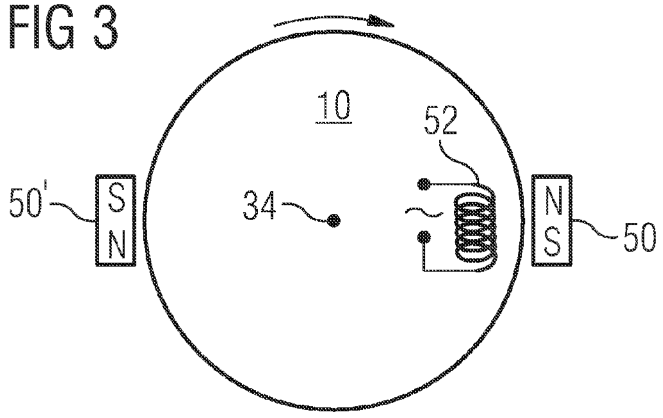
FIG. 3 is a view through the longitudinal axis of an impeller and including a rotational speed detecting arrangement for use in the first embodiment.

The embodiment is not limited to a situation in which the components of the datalogging device are located in the nose-end of the impeller as shown. Some or all of these components may be located in other parts of the impeller, e.g. away from the end-face of the impeller and/or away from the longitudinal axis 34. An example of this is shown in FIG. 3. FIG. 3 illustrates a further alternative method of detecting speed, which is to use a magnet and magnetic sensor combination to provide a signal representing rotational speed. A permanent magnet 50 is disposed adjacent the circumferential face of the impeller 10 and is mounted on the turbocharger casing in any convenient location. Provided on or in the impeller in a radially outer region thereof is a pickup coil 52, which outputs alternating signals as the impeller rotates. These signals are used to provide an indication of rotational speed. Additionally, however, they may also be fed to a rectifier arrangement (not shown), which provides a DC voltage level for powering the electronics in the data logger 12. FIG. 3 also shows the possible use of a second magnet 50' diametrically opposite the first, by means of which the coil 52 may be made to output signal excursions every half-revolution of the impeller instead of every full revolution. Hence the frequency of the coil signal will be twice what it would be if only one magnet 50 were used, so that effective smoothing of the DC voltage from the rectification stage can be achieved with the aid of a smaller smoothing capacitance.

Use of such powering by magnetic induction has the advantage of permitting the use of a very small battery 28 purely for data retention purposes, i.e. to render the memory 14 non-volatile, although memories are available which do not require battery backup to enable them to retain data. Furthermore, although such a magnetically induced power source would be ineffective when the rotor was at a standstill, less processing is needed in this state of the rotor anyway, so that less power is needed. Consequently this is not a drawback.

It is assumed in connection with FIG. 3 that the coil 52 will be radially offset from the longitudinal axis 34 in order to lie sufficiently close to the magnet to pick up the flux therefrom. In this case it is assumed that some form of impeller balancing will be required due to the offset weight.

The various electronic components of the datalogger 12 are advantageously incorporated into a single microchip. The battery, which has to be replaced periodically, is preferably housed behind a protective cap at the nose-end 32, which can easily be removed by a service technician. If the speed detector arrangement of FIG. 3 is employed, then the datalogger electronics are advantageously located in the same place as the coil and rectification circuitry for powering purposes. Along with the battery, a connector arrangement coupled to the memory is provided behind the protective cap, so that the data saved in the memory can be readily read out following removal of the cap. Hence it is envisaged that communication with the datalogger will be mechanical in nature. Nevertheless, the invention also envisages the use of other forms of communication, including optical and radio.

In order to calibrate the detectors 16, 18, the speed and temperature data recorded in the memory 14 are read from the memory and compared with actual engine operating records. Any necessary calibration factors for the two parameters are either recorded externally for use during the external processing procedure explained below, or are written into the memory 14 itself and used to operate on the stored data in that memory by way of the controller 30.

Following calibration and during normal use of the turbocharger, the speed and temperature data stored in the memory 14 are read out and fed into an external computer (e.g. a laptop computer), where they are operated on by a suitable algorithm, which may be similar to, or even the same as, the one employed in the ABB "SIKO" concept. In one embodiment, the memory 14 stores periodic sampled values of speed (e.g. one sample every 10 seconds, this period being derived from the clock source 24) and the external computer algorithm calculates the minimum and maximum values of any speed change and uses these two values to arrive at an evaluation of fatigue damage for the type of impeller concerned. Similarly, the memory stores periodic sampled values of inlet temperature and these values, together with the speed values, are manipulated by the computer algorithm to arrive at an evaluation of the stresses and temperatures at particular sites of the impeller at which creep is critical. These data, together with the record of the time spent by the impeller at the recorded conditions, are used to calculate the creep damage. Creep damage and fatigue damage are then combined, assuming they interact, and the total reduction in impeller life can be evaluated. Furthermore, by comparing this reduction with the anticipated total lifespan of the impeller, a figure for the remaining lifespan can be derived.

An alternative scenario is one in which the datalogger in the impeller carries out the necessary calculation of expired and possibly also remaining lifespan. In that case, all that is read out of the datalogger is primarily these lifespan figures.

It should be borne in mind that, although the temperature that is sampled is the ambient temperature usually at the turbocharger inlet, the temperature that is relevant to the calculation of creep is that at the sites where creep is most likely to occur, i.e. in those places which suffer a rise in temperature due to the turbocharger compression action. These two temperatures are, however, readily related to each other by taking into account the impeller rotational speed. More precisely, the temperature T of the impeller at a given radius r is given by:

$$T = T_{amb} + k \cdot \frac{\Omega^2 r^2}{2C_p}$$

where $T_{amb}$ is the stagnation temperature at the impeller inlet (typically the ambient temperature), Ω is the rotor speed in radians per second, $C_p$ is the air specific heat capacity at constant pressure and k is a geometry-related variable, which has an empirical range of values dependent on the impeller geometry. A typical range is, for example, $1 \leqq k \leqq 2$. k is constant for a particular location on the surface of the impeller. For the surface of the impeller where air is being compressed, k=1, whereas for other parts, including those parts where creep is important, typically the back of the impeller, k may be greater than 1.

A specific example of a cumulative-damage determination technique, as outlined in the preceding paragraph, is the so-called Palmgren-Miner Rule, which is described in the publicly available literature. This Rule—which incidentally is employed in the ABB "SIKO" concept outlined earlier—supposes that a body (in this case, an impeller) can tolerate a certain amount of damage, D. If that body suffers damages $D_i$ (where i=1, . . . , N) from N sources, then failure would be expected to occur when $$\sum_{i=1}^{N} D_i = D$$

Alternatively, $$\sum_{i=1}^{N} \frac{D_i}{D} = 1$$

defines failure of the component, where $D_i/D$ is the fractional damage received from the ith source.

Figure 4:
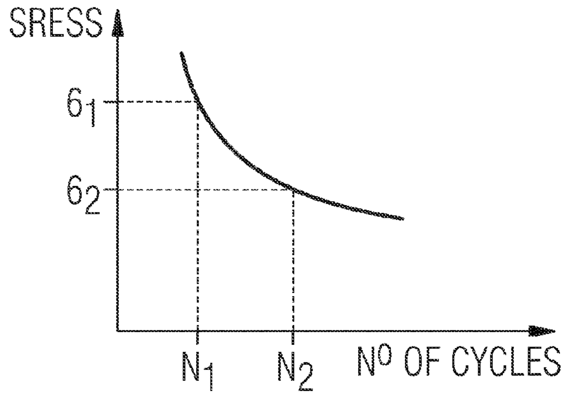
FIG. 4 is a graph of the S-N characteristic of a material for use in the Palmgren-Miner Rule for estimating fractional fatigue-related damage in such a material.

This linear damage concept can be used to determine fatigue damage by considering a situation in which a component is subjected to $n_1$ cycles at alternating stress $\sigma_1$, $n_2$ cycles at alternating stress $\sigma_2$, . . . , $n_N$ cycles at alternating stress $\sigma_N$. From the S-N curve for the material of which this body is composed, the number of cycles to failure can be determined. This number is $N_1$ at $\sigma_1$, $N_2$ at $\sigma_2$, . . . , $N_N$ at $\sigma_N$ (see FIG. 4).

The fractional damage at a stress level $\sigma_i$ can be defined simply as $n_i/N_i$. The Palmgren-Miner rule then stipulates that fatigue failure occurs when $$\sum_{i=1}^{N} \frac{n_i}{N_i} = 1.$$

To give an example of this technique in action, it is assumed that a component is subjected to fatigue in which 10% of its total lifespan is spent at an alternating stress level of $\sigma_1$, 30% at $\sigma_2$ and 60% at $\sigma_3$. If from the S-N diagram for this material the number of cycles to failure at $\sigma_i$ is $N_i$ (i=1, 2, 3), then from the Palmgren-Miner rule failure occurs when:

$$\frac{0.1n}{N_1} + \frac{0.3n}{N_2} + \frac{0.6n}{N_3} = 1.$$

Hence solving for n gives:

$$n = \frac{1}{\left(\frac{0.1}{N_1} + \frac{0.3}{N_2} + \frac{0.6}{N_3}\right)},$$

which is the total number of cycles to failure for the material and body in question. In the present case, since the number of cycles already experienced by an impeller will already be known from the data contained in the datalogger, an estimate of the fraction of its total lifespan that has already expired can be made. This therefore provides an indication of both elapsed and remaining lifespan for a particular impeller made of a particular material.

The analysis just presented relates solely to fatigue damage, but can also be extended to take creep into account. A straightforward method of adding the effects of creep damage and fatigue damage together will now be described.

Cycles ($n_i$, i=1–N, etc., as described above) and hours of operation at particular loads are treated as follows. Assume, in addition to the cycles described above, that the impeller has been running at three loads ($l_4$, $l_5$ and $l_6$) where each load is characterised by an ambient temperature ($T_4$, $T_5$, $T_6$) and a rotational operating speed ($R_4$, $R_5$, $R_6$) and the impeller has been running at these loads for three time durations ($t_4$, $t_5$, $t_6$). By analysing the impeller for creep damage, typically using Finite Element Analysis, the time taken to fail due to creep (H) can be calculated as a function of temperature and rotational speed. This information may be stored in a look up table very similar to the table in FIG. 6, which is explained in greater detail below, although in this case the data in the table will be hours until failure (H) at the given conditions, rather than the hours spent at that condition (t). Using such a table, the hours to failure associated with the three conditions can be evaluated ($H_4$, $H_5$ and $H_6$). The damage associated with the three loads can then be calculated in a similar way to the fatigue damage, i.e. $t_4/H_4+t_5/H_5+t_6/H_6$. Thus in the extended example, using the simplest form of the interaction between creep and fatigue, the total fractional damage is evaluated as $n_1/N_1+n_2/N_2+n_3/N_3+t_4/H_4+t_5/H_5+t_6/H_6$. When the sum of all the fatigue and creep damage components associated with an impeller's operation exceeds 1, the impeller's life is considered to be consumed.

While the linear Palmgren-Miner Rule can give good results in many cases, it has the drawback that it assumes that the order of loading (i.e. whether $\sigma_2$ comes before or after $\sigma_1$ (or $\sigma_3$ in the above example)) is of no significance. In reality this might not be the case.

In order to avoid the above shortcomings of the linear method, it is possible to use one of a number of non-linear damage-assessment methods for deriving the cumulative damage. These methods, plus the linear method, are described in, for example, the graduate study topic "ME541—Fatigue of Materials, Lectures 12 & 13", published by the University of Washington in Seattle, Wash., course description as modified on 27 Jun. 2005.

The data storage arrangement just described has assumed that the temperature and speed samples (at a rate of, e.g., one every 10 seconds) will all be stored in the memory 14 for subsequent processing outside the turbocharger. A drawback of this approach is that the memory storage capacity required to store such data over a typical service interval of 2 years is very considerable. A different approach requiring significantly less capacity is to employ so-called "data binning", in which the data are placed into one of a number of discrete data ranges, rather like the data ranges of an histogram. An example of this is shown in FIG. 5, in which the column headings represent temperature ranges (0-5° C., 5-10° C., etc), while the row headings represent speed ranges (10000-10999 rpm, 11000-11999 rpm, etc.). The body of the table of FIG. 5 includes some representative figures for the number of hours at which an impeller has run within a particular speed range ("speed bin") and at the same time within a particular temperature range ("temperature bin"). Thus, in the example shown, the impeller ran for 6 hours at between 13000 and 13999 rpm and between 5° C. and 10° C. Similarly, it ran for 8 hours between 10000 and 10999 rpm and between 20° C. and 25° C. The recording hours are defined by the clock source in the datalogger. These data are used to calculate creep, from which the elapsed life of the impeller can be derived. Such a calculation might involve the use of a look-up table, for example.

Similarly, the other main parameter necessary for the calculation of elapsed life, namely fatigue, can be calculated from the number of accelerations and decelerations undergone by the impeller in a given time period. Again a lookup table might be employed to derive the fatigue values. An example of this is shown in FIG. 6. In FIG. 6 an indication is given of the number of accelerations from a lower speed range to a higher speed range over a given time period and of the number of decelerations from a higher speed range to a lower speed range over the same period. Thus, in the table shown in FIG. 6, over a period corresponding to the impeller's life to a particular point in time, the impeller decelerated four times from the 11501-12000 rpm bin to the 10500-10999 rpm bin and accelerated 56 times from the 12501-13000 rpm bin to the 14000-14999 rpm bin. Here the number of accelerations/decelerations for each bin correspond to the number of cycles for discrete stress levels. Hence approximate or equivalent stress levels as a range are used, rather than exact values.

Whether the full-data storage technique or the reduced-data storage technique just described is employed, it is not necessary to use a real-time clock for the clock 24 in FIG. 3, since no correlation of sampled speed and temperature values with real time takes place. Hence the clock can be a simple local quartz-clock arrangement.

This first embodiment just described has the advantage over the prior-art methods that the relevant data characterising the impeller are kept on the impeller itself, rather than in an external memory associated with the particular engine or engines in which the impeller has been or is being used. Hence the elapsed life at any one time can be determined by processing the data stored in the memory 14 and an accurate assessment of the remaining life can thus be made. This is useful when it is desired to re-employ an impeller in another turbocharger and/or in another engine environment, or even when it is simply desired to know how much remaining life the impeller has in its present turbocharger and engine environment. The impeller itself always contains the up-to-date data on its elapsed lifespan, regardless of the environment in which it has been used. Thus the measures just described enable an impeller to be used substantially over the whole of its anticipated lifespan without incurring any significant risk of damaging other turbocharger components, or harming the life and limb of personnel involved in the running of the turbocharger. Replacement costs for the other turbocharger components are therefore minimised, as are also insurance premiums for service personnel, who might otherwise be at risk.

As regards turbochargers that are due for refurbishment or are to be used in a different engine, the described embodiment has the result that an impeller can be reutilised with confidence.

Figure 7:
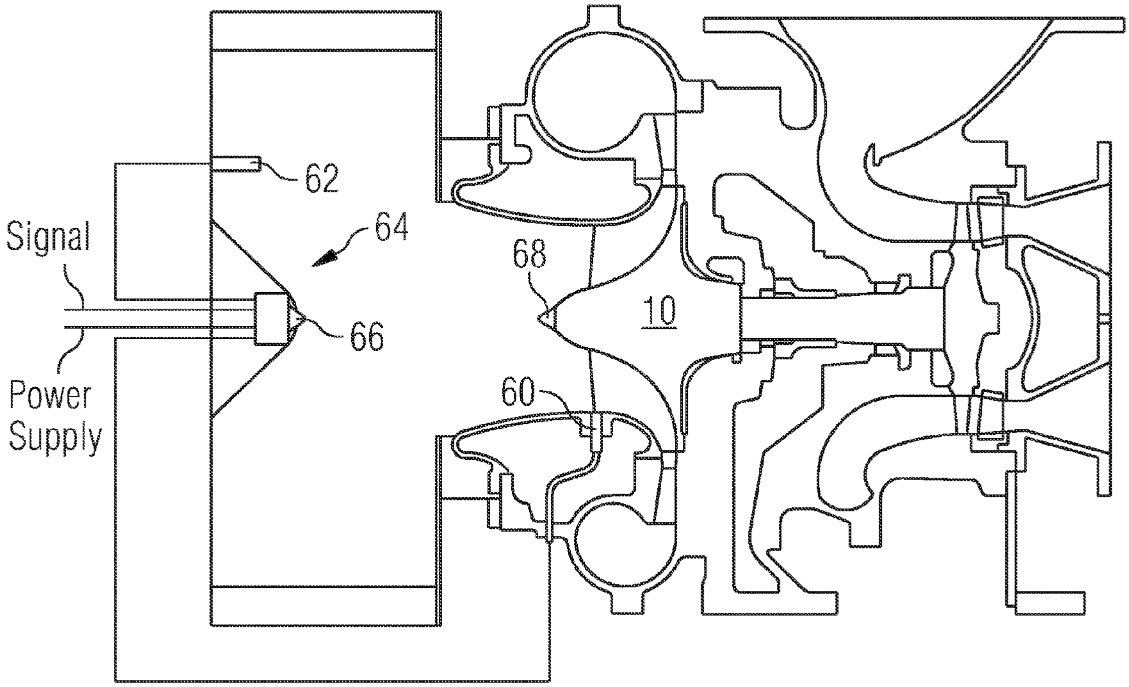
FIG. 7 is a side elevation of a turbocharger in accordance with a second embodiment of the present invention.

A second embodiment of the invention is illustrated in FIG. 7. In this embodiment the impeller once again houses a memory for storing data, but the speed and temperature detection functions are performed outside the impeller by a speed detector 60 and a temperature detector 62 accommodated in appropriate parts of the turbocharger housing. In the illustrated example the speed detector, which is an inductive HF probe, is located near the nose-end of the impeller, while the temperature detector, which is a thermocouple, is situated at the air-intake end of the turbocharger.

The outputs of the two detectors 60, 62 are fed to an evaluation unit 64. The unit 64 comprises an antenna 66, by means of which it can communicate with a corresponding antenna 68, which is part of an RF transponder or "tag" located at the nose-end of the impeller 10 along with the memory (not shown) mentioned in connection with the first embodiment. The tag is of a type known per se and preferably operates in the GHz range. RF tags have been commonly used as identification devices, for example for identifying livestock, tracking containers and automatically identifying vehicles. They are of either the active or passive type. Active tags are powered by their own battery, whereas passive tags use an incoming received signal to power the electronics on the tag. This is similar to the FIG. 3 speed detection arrangement, except that in this case the signal which is rectified to form the power source is not that arising from magnetic induction, but that arising from an RF transmission from the antenna 66 to the antenna 68.

It can be advantageous to use tags which operate in the GHz range. A significant benefit of this frequency range is the need for only a small antenna, which helps in the miniaturisation of the tag. An example of a suitable read-write chip for an RF tag is that produced by the Maxell Corporation of America, a subsidiary of Hitachi Maxell. This chip has a capacity ranging from between 1 kbyte to 4 kbyte and is only 2.5 mm square including its built-in antenna. The antenna is based on the Coil-on-Chip (RTM) design, in which the antenna is formed directly on the surface of the chip without the need for soldering. This results in greater reliability.

The temperature and speed values detected over time by the detectors 60, 62 are stored initially in a local memory in the evaluation unit 64. These values, or values derived therefrom (e.g. cumulative damage or expired/remaining life), are then transmitted to the tag antenna 68. This may be done either at regular intervals, e.g. once a day or once a week, or at strategic points in the lifetime of the impeller. Such points may be times of rest of the impeller, e.g. when the engine is at a standstill, or when the impeller is removed from the turbocharger.

Whether an active or passive tag is employed depends on two main factors: firstly, the servicing overhead in terms of having to replace a battery and, of course, the cost of the battery itself; secondly, the anticipated distance between the evaluation unit antenna 66 and the tag antenna 68. Normally, if this distance is large, a battery—and hence an active tag—may be required. The average operational lifespan of a tag battery is approximately 5 years, which is not overly onerous as regards servicing overhead. On this basis, and assuming that it may be desirable to be able to cater for a range of distances between the two antennas, an active tag will often be preferred. However, it may be possible to mount the evaluation unit on the turbocharger wall next to the speed detector. This would reduce the transmission distance to the tag antenna, but might adversely affect the quality of transmission, depending on where in the tag the antenna was located.

In order to reduce the amount of data to be stored in both the evaluation unit 64 and the tag, but especially in the tag in view of its small size, a preferred realisation of the second embodiment does not store all of the data which are sampled over time, but uses sets of the speed and temperature data to calculate a cumulative damage done to the impeller during operation of the latter. In this method the load and stresses experienced by the impeller over a predetermined time period are integrated in the evaluation unit and compared with a database in that unit that contains the equivalent lifespans. In other words, a mapping is made from the cumulative-damage value to the corresponding used-life value, similar to the procedure with the first embodiment. It is this used-life value which is transmitted to the tag. Each value of used life that is calculated at the end of the aforementioned predetermined period in the evaluation unit 64 is added to the previous used-life value relating to the previous predetermined period in order to update the cumulative used-life estimate. This cumulative used-life estimate is then transmitted to the tag.

Although, depending on the size of the impeller memory, it might be desirable to limit the amount of data to be stored in that memory, there would normally not be quite the same incentive to restrict the amount of data saved in the evaluation-unit memory. This is because the evaluation unit will normally be part of a significantly larger unit and therefore have considerably greater capacity than the impeller memory. Consequently it would be feasible to store all the raw data that was being generated by the sampling process in the evaluation-unit memory, while only transmitting a reduced quantity of data derived from this raw data to the impeller memory. In fact, the invention envisages a situation in which the raw data in the second memory in the evaluation unit are later accessed for analysis to derive perhaps greater detail regarding the damage being sustained by the impeller.

As an alternative to, or in addition to the cumulative used-life value, an estimate of the remaining life may be made and transmitted to the tag. As a further alternative, the cumulative damage values may be transmitted instead of, or in addition to, the cumulative used-life value and/or the remaining-life value. If the cumulative damage values alone are transmitted to the tag, then, when these values are retrieved from the tag, they are used by the evaluation unit to calculate the elapsed life of the impeller by the aforementioned mapping process.

In a preferred realization of the second embodiment, the tag is initially loaded with ID information including the identity number of the impeller and the identity number of the tag. Then the tag is periodically loaded with the aforementioned accumulated damage and/or used-life value. In addition, however, further information including a value representing the total number of hours over which the impeller has been operating and the total number of starts made by the impeller is also preferably loaded from the evaluation unit. These latter two values are, like the used-life or damage values, cumulative. This further information enables the evaluation unit to determine, firstly, that the tag is functioning properly; secondly, that the tag—and hence impeller—is the correct one; and, thirdly, that the latest speed and temperature measurements start from the right baseline. When all this has been established, the evaluation unit transmits to the tag the updated values of the total number of operating hours, the total number of starts and the cumulative damage and/or cumulative expired life. The damage and/or expired-life data are calculated in the evaluation unit 64 before being transmitted to the tag.

When a different impeller is fitted to the turbocharger, the values of remaining operation lifetime, ID and further information stored in the impeller memory are read by the evaluation unit and stored in that unit's memory. This preferably occurs automatically following the fitting of the different impeller.

When a new, i.e. unused, impeller is fitted, the evaluation unit resets the various cumulative values (operating hours, starts, damage and/or expired life) to zero and, where appropriate, the value of remaining lifetime to maximum, in the evaluation unit's memory. However, it may in exceptional circumstances be thought desirable to reset the evaluation-unit memory to positive values other than zero (and remaining lifetime to less than maximum), perhaps in order to slightly reduce the allowed total service life of the new impeller. This can help to provide a greater margin of safety, for example. Another example of a non-zero reset is where one or more components in the measurement or evaluation chain is malfunctioning, so that it becomes necessary to manually assess the expired and/or remaining lifespan of the tag in question. In that case the evaluation-unit memory may need to be reset to values other than zero (or maximum, in the case of remaining lifetime).

Where it is found that the tag is not functioning correctly, or is not the correct tag, the evaluation unit signals an alarm for the attention of maintenance personnel. The alarm is preferably also activated when one or both of the detectors develops a fault.

The invention envisages the provision of a display for the communicating of various pieces of information to maintenance personnel. Such information will advantageously include: operational status of the temperature and speed detectors; cumulative damage figures and/or expired lifespan and/or remaining lifespan, and the alarm signal just mentioned. Whether an audible alarm is useful depends on the environment; in a noisy engine room, for instance, it may be totally ineffective. Since the cost of a turbocharger is far higher than the cost of the hardware required for the detecting and evaluation functions that have been described, it is conceivable to employ for the display quite a sophisticated information centre, such as is used on most cars showing data on distance, speed and fuel consumption, etc. In the present case, however, the information being communicated would be, as already mentioned, primarily information relating to the lifespan of an impeller.

The display may be a part of the evaluation unit or may be situated in any other suitable location that is separate from the impeller. Where, say, a turbocharger was being used on an engine having an information centre such as described in the preceding paragraph, it would be possible to take advantage of that information centre as the display. Indeed, it may even be possible also to integrate the evaluation-unit electronics themselves into the information centre.

With this embodiment, as with the first, the impeller contains a record of its own expired life so that, should it be removed from the turbocharger in which it is presently installed to a different turbocharger having possibly different duty characteristics, the recorded value of expired life can be used to estimate the likely remaining operational life of the impeller in its new surroundings. As previously explained, this is possible because a correlation can be established between the duty characteristics of a particular environment and the expected lifespan of an impeller in that environment.

The second embodiment has the additional advantage that, should the tag be somehow damaged—for example, when the impeller is removed—a record of cumulative expired life, number of operating hours and starts is still contained in the evaluation-unit memory. These values can then be transmitted to a new tag fitted to the impeller when the impeller is once again put into service.

As with the first embodiment, instead of employing an RF transmission system for communication to and from the tag, it is possible to employ other types of system such as an optical transmission system. This, however, has the drawback of possible contamination of the optical transmitters and receivers required for such a system. A transmission system based on mechanical contact between the tag and the evaluation unit is also conceivable, again in similar vein to one realization of the first embodiment. However, the preferred transmission method is RF, since this has a number of advantages, as already explained.

For the speed detection function in both the first and second embodiments, it is possible to employ a magnetic system based on the use of a Hall-effect device instead of a pickup coil as shown in FIG. 3. In this case one or more magnets would again be situated on the casing of the turbocharger adjacent the impeller and the Hall-effect device would be included with the electronics in the impeller.

It has so far been assumed that the main factors governing the lifespan of a rotary component are stresses relating to speed and temperature. However, an additional factor that could be taken into account is the ageing of the component. Ageing is the change in the properties of the component material with time and temperature, which can affect the remaining life of the component. Other more secondary parameters which contribute to ageing are the stress level and the presence of chemicals in the environment surrounding the component. More accurate assessments of remaining life can be made if this additional factor of ageing is taken into account. One conceivable way of doing this is to multiply the clock rate used for assessing damage by a factor relating to the material properties. This could be a moving pointer on a material property curve, for example. Hence, as the material ages, the clock rate increases to take this into account. A practical implementation of this scheme employs two lookup tables: one for various rotary-component loads and relating to temperature and speed and containing unaged values, the other relating to temperature and time and containing ageing values. The product of the values from these two tables can be integrated over the time during which the load has been applied to the rotary component. Alternatively, a lookup table could consist of a matrix containing several lookup tables, each one for a different state of ageing. It would then be possible to interpolate between these predetermined values, as mentioned earlier, but this time using also the ageing as an additional variable.

Another assumption that was made in the above description of the derivation of expired lifespan is that the fatigue damage to be taken into account is the low-cycle fatigue (LCF). There is, however, a high-cycle fatigue (HCF), which also causes damage to a rotary component such as an impeller. Whereas LCF results from temperature cycling of the impeller (i.e. heating up and cooling down repeatedly), HCF is generated by deflections in the impeller due to, for example, vibrations and flutter during operation. Thus HCF is linked with a higher excitation frequency than LCF and indeed in some environments an HCF-related mechanical failure can, as a result, take place within a very short period of time, perhaps just a few minutes and in some cases even less than that. In such environments HCF-type damage might be expected to be very significant. This is not normally the case with impellers, however, as impellers have a high stiffness relative to their mass. Consequently there is normally no incentive to include the effects of HCF in the calculations of impeller damage.

It has so far been assumed that the impeller memory will be significantly smaller, i.e. have significantly less capacity, than the evaluation-unit memory. While this may well be true, it is anticipated that memory technology in the near future might advance to the point where a very considerable amount of data might be stored in a small space, such as may be occupied by the impeller memory. In that case it is conceivable that all of the data necessary for the calculation of the expired/remaining lifespan might be stored on the impeller in the first memory and not merely in the evaluation unit in the second memory. Hence much, perhaps even all, of the data stored in the second memory might end up being transmitted to the first memory.

The benefits of much increased memory capacity could apply not only to the second embodiment involving the evaluation unit, but to the first embodiment also. In that case all the raw sampled data from the detectors might be stored directly in the impeller memory for the processing described earlier.

Although the invention has been described in terms of a turbocharger impeller, it may also be applied to other environments in which the operational life of a rotary component in a rotating machine is required to be evaluated. Such environments include industrial-type rotating machines used in, for example, mixers, cutters, grinders and steel and paper-mill rolling machinery; heavy-duty washing equipment used in hospitals and prison laundries and compressors used in large-scale refrigeration plants in slaughter houses and food markets, etc. A further application is in assessing the expired/remaining lifespan of pumps, such as are used in large numbers in refineries and the process industry and indeed in many other environments. There may be concern over the effectiveness of transmitting radio waves through liquids, to which the impellers of such pumps might be exposed. However the end face of the impellers in such pumps usually passes through the housing on the centreline of the rotor, so that it is surrounded by air instead of liquid.

Still other applications to which the invention may be applied are wheels on motor vehicles. Formula 1 racing cars, for example, require very reliable wheels for safety reasons and it may be possible to mount a unit such as has been described above in connection with the first or second embodiment on such a wheel. A particularly advantageous configuration might be to employ an RF tag under the second embodiment, with the temperature and speed detectors located together with an evaluation unit off the wheel and the results of the processing—i.e. values of expired/remaining lifespan of the wheel—displayed on a display inside the associated vehicle. Alternatively, if the wheel were being tested in isolation without being mounted on a vehicle, the evaluation unit and detectors could be mounted on a test jig driving the wheel.

In summary, therefore, the present invention provides a rotary component having a memory device into which is written information relating to the elapsed and/or remaining lifespan of the component. This information may be restricted to such lifespan-related data, or may include more detailed data on the temperature and speed of the rotary component where the memory has the capacity to store such more detailed data. Temperature and speed sensing take place either on the rotary component itself or external thereto and information is relayed to the memory device ideally by radio transmission, in which case the memory device may be part of an RF tag. The invention is useful in segments of the market in which customers have a large number of the same product (e.g. turbochargers or turbocharger impellers), which are exchanged and used in different vehicles or other environments. Typical examples are airlines and gas and oil pipelines, where gas turbines are exchanged and reused on a regular basis. Since the history, or the cumulative effect of the history, of the rotary component in question is contained on the component itself, and not merely external thereto, the expired lifespan, and hence remaining lifespan, of the component can be easily determined from the contents of the memory device regardless of how many different environments the component has been subjected to. This stands in contrast to the prevailing situation, in which it is necessary to rely on the accuracy of engine-room staff or service personnel to keep track of the damage suffered by a particular rotary component in a particular engine, say. This lack of reliability is multiplied many times when the component is used many times in different settings.

It is also advantageous if the on-board memory device further contains ID data identifying that particular device. Hence a number of the components can be kept in stock and readily identified and their remaining lifespan determined. Armed with this knowledge a potential customer can know if a particular rotary component will be suitable for the purpose for which he requires it, or whether it would be likely to fail in service.

The invention claimed is:

1. An apparatus comprising:

a rotary component having a rotational axis;

a rotor shaft arranged along said rotational axis of said rotary component;

a housing surrounding said rotor shaft;

a first memory device disposed on said rotary component that stores data relating to past use of the rotary component, wherein the data is derived by detecting a rotational speed and a temperature of said rotary component, wherein the data includes values of the rotational speed of said rotary component and either values of a temperature of at least one part of said rotary component, or values of an ambient temperature of said rotary component; and an RF transponder for reading-out the data stored in said first memory device.

2. The apparatus of claim 1, wherein the derived data is fatigue damage and creep damage sustained by said rotary component.

3. The apparatus of claim 2, wherein the fatigue is a low-cycle fatigue or a high-cycle fatigue, the creep damage is cumulative damage sustained by said rotary component.

4. The apparatus of claim 3, wherein the data includes one or both of an expired operational lifetime of said rotary component and a remaining operational lifetime of said rotary component; and the data include data relating to changes in material properties of said rotary component due to aging of said rotary component.

5. The apparatus of claim 4, wherein the data is selected from the group consisting of: an identity number of said first memory device, a total number of hours during which rotary component has been operating, a total number of starts undergone by said rotary component, and combinations thereof.

6. The apparatus of claim 5, further comprising:

a speed detector for detecting the rotational speed;

a temperature detector for detecting the temperature; and a processing device for sampling the speed and temperature values, deriving the data from the speed and temperature values and writing the data into said first memory device.

7. The apparatus of claim 6, wherein said temperature detector is a thermocouple or a thermistor, and wherein the speed detector is selected from the group consisting of: a sensing coil, a Hall-effect device, an accelerometer for measuring vibrations of said rotary component and a strain gauge mounted on a flexible component in or on said rotary component that is distortable under loading of said rotary component.

8. The apparatus of claim 7, further comprising a clock source for providing a time reference for the processing device.

9. The apparatus of claim 8, wherein said rotary component is selected from the group consisting of an impeller of a turbomachine, a rotor of a rotating electrical machine and a wheel.

10. The apparatus of claims 9, wherein the first memory device is arranged at or near an end-face of said rotor or a longitudinal axis of said rotor.

11. A rotating machine comprising:

a rotary component having a rotor shaft arranged along a rotational axis thereof;

a housing that surrounds said rotor shaft;

a first memory device disposed on said rotary component that stores data relating to past use of said rotary component, where the data is derived by detecting a rotational speed and a temperature of said rotary component, wherein the data includes values of the rotational speed of said rotary component and either values of a temperature of one or more parts of said rotary component, or values of an ambient temperature of said rotary component; and a speed detector, a temperature detector and an evaluation device arranged on said housing, said evaluation device including a second memory device and a transmission device, the evaluation device being connected to said speed detector and to said temperature detector and arranged to:

sample values of the rotational speed and the temperature, derive the data relating to past use of said rotary component from the sampled values of the rotational speed and the temperature, store the derived data in said second memory device, and transmit some or all of the stored data in said second memory device to said rotary component, at predetermined points in time by way of said transmission device, wherein said rotary component comprises said first memory device, said rotary component is arranged to receive at least a portion of the data and to store the data in said first memory device by way of a reception device.

12. A rotating machine comprising:

a rotary component having a rotor shaft arranged along a rotational axis thereof;

a housing that surrounds said rotor shaft;

a first memory device disposed on said rotary component that stores data relating to past use of said rotary component, wherein the data is derived by detecting a rotational speed and a temperature of said rotary component, wherein the data includes values of the rotational speed of said rotary component and either values of a temperature of one or more parts of said rotary component, or values of an ambient temperature of said rotary component; and a speed detector, a temperature detector and an evaluation device arranged on said housing, said evaluation device including a second memory device and a transmission device, said evaluation device being connected to said speed detector and the temperature detector and arranged to:

sample a speed and a temperature, derive values for cumulative fatigue and creep damage suffered by said rotary component from the sampled values of the speed and the temperature and to store the derived values in said second memory device, derive from the cumulative fatigue and creep damage a value of an expired operational life of said rotary component and store the value of the expired operational life in said second memory device, derive the value of a remaining operational life of said rotary component and store value of the remaining operational life in said second memory device, and transmit at least a portion of data stored in the second memory device to said rotary component at predetermined points in time by way of said transmission device, wherein said rotary component is arranged to receive some or all of the data by way of said reception device and to store the data in said first memory device.

13. The rotating machine of claim 12, wherein said first memory device is part of an RF transponder, and wherein said first memory device stores an identity signature of said RF transponder.

14. The rotating machine of claim 13, wherein said evaluation device is arranged to further store in said second memory device said identity signature and one or both of a total number of hours during which said rotary component has been operating and a total number of starts undergone by said rotary component.

15. The rotating machine of claim 14, wherein, prior to updating said first memory device with new values of the further information and of the remaining operational life, the evaluation device is arranged to compare the identity signature and existing values of the further information held in said second memory device with corresponding values held in said first memory device and, if the values are the same, to subsequently store the new values in said first memory device.

16. The rotating machine of claim 15, wherein said evaluation device is arranged to make the comparison and transmit the new values at periodic intervals or when said rotary component has stopped rotating or when said rotary component is to be removed.

17. The rotating machine of claim 16, wherein said evaluation device is arranged such that, when a different rotary component is fitted to the rotary machine, the values of the remaining operational lifetime, and the identification signature and further information stored in the first memory of the different rotary component are read and stored in said second memory.

18. The rotating machine of claim 17, wherein, when the different rotary component is an unused component, the values of the remaining operational lifetime and of the further information are maximum and zero respectively.

19. The rotating machine of claim 18, wherein, following a fitting of the different rotary component to the machine, the values that are stored in said second memory device are modified versions of the values stored in said first memory device.

20. The rotating machine of claim 19, wherein an alarm is activated when it is determined that said RF transponder is not a correct RF transponder or that said RF transponder is not working.

* * * * *